United States Patent
Chiu et al.

(10) Patent No.: US 7,597,463 B2
(45) Date of Patent: Oct. 6, 2009

(54) HOLDER STRUCTURE

(75) Inventors: Chen-Ming Chiu, Hsin-Chu (TW);
Fang-Chih Lu, Hsin-Chu (TW);
Kang-Chung Liu, Hsin-Chu (TW);
Tang-Bo Chen, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 40 days.

(21) Appl. No.: 11/963,083

(22) Filed: Dec. 21, 2007

(65) Prior Publication Data
US 2008/0232099 A1 Sep. 25, 2008

(30) Foreign Application Priority Data
Mar. 23, 2007 (TW) ............... 96110078 A

(51) Int. Cl.
*F21V 21/00* (2006.01)
(52) U.S. Cl. .................. 362/382; 362/225; 362/260
(58) Field of Classification Search .................. 362/29, 362/225, 260, 382
See application file for complete search history.

(56) References Cited
U.S. PATENT DOCUMENTS
2006/0044813 A1 3/2006 Yun
2006/0109663 A1 5/2006 Choi
2007/0030663 A1* 2/2007 Ryu ........................... 362/29

* cited by examiner

*Primary Examiner*—Sandra L O'Shea
*Assistant Examiner*—Meghan K Dunwiddie
(74) *Attorney, Agent, or Firm*—Kirton & McConkie; Evan R. Witt

(57) ABSTRACT

The present invention discloses a holder structure for retaining at least one lamp and associated wire within a backlight module, which includes a main body, a reflector, and a first groove formed on an external sidewall of the main body. The main body has at least one first orienting slot for accommodating the lamp therein, and a second orienting slot for accommodating a high-voltage power wire therein. Said first groove communicates with the first and second orienting slots to divide a lateral slot wall of each of the first and second orienting slots into two opposite flexible walls which can provide flexibility required for assembly of the lamp and associated wire. Each two opposite flexible walls have two protrusions respectively formed on the outsides thereof for hooking with corresponding openings defined on the reflector, whereby the lamp and power wires are able to be firmly retained in the associated slots, respectively.

7 Claims, 8 Drawing Sheets

HOLDER STRUCTURE

BACKGROUND OF THE INVENTION

1. Field of the Invention

The present invention relates to a holder structure, and more particularly to a holder structure for retaining at least one lamp and associated wires within a backlight module.

2. Description of the Prior Art

At present, as Liquid Crystal Display (LCD) has greater advanced performances such as light weight, power consumption savings, lower blinks, lower-radiation and so on, it has been widely used to replace the conventional cathode-ray tube (CRT) display device. A common LCD may principally consist of a lamp (such as a Cold Cathode Fluorescent Lamp (CCFL)), a backlight module and a plurality of power wire assembly. In the backlight module, a positioning device is essential for positioning and retaining the lamp so as to avoid free movement of the lamp within the backlight module, which might pull apart the solder point between the lamp and the power wire assembly to result in improper connection therebetween.

Referring to FIG. 1, a holding device 10 for a conventional backlight module comprises a first fixture portion 110, a second fixture portion 122 and a connecting portion 130 for interconnecting the first and second fixture portions 110, 122. On one side edge of the first fixture portion 110, a protruding bar 112 is formed along a lengthwise direction, and on one side edge of the second fixture portion 122, a groove 126 is formed corresponding to said protruding bar 112. Because the first and second fixture portions 110, 122 are as two opposite upper cover and lower cover, the lamp 142 that is connected with a power wire assembly 144 through a solder point 146 can be positioned between the first and second fixture portions 110, 122. When the second fixture portion 122 is covered with the first fixture portion 110 by mating the protruding bar 112 with the groove 126, the lamp 142, the solder point 146 and the paired power wire assembly 144 can be accommodated and retained within a space defined between the first and second fixture portions 110, 122. Hence, even if a part of the power wire assembly 144 that extends outward through a neck portion 166 is pulled, the power wire assembly 144 will not move, arbitrarily. However, while the holding device 10 is pulled or vibrated by an external force, the mating between the protruding bar 112 and the groove 126 might become loose to open the first and second fixture portions 110, 122, and the lamp 142 and power wire 144 would fall off from the holding device 10. Only the mating (like a close fit) between the protruding bar 112 and the groove 126 is not enough to ensure firm close of the first and second fixture portions 110, 122. Constitutionally, it can't retain the lamp 142 and the power wire assembly 144 within the holding device 10, effectively.

As shown in FIG. 2, another conventional holding device 20 comprises a wire orienting portion 22, and a lamp orienting portion 24 which has an end integrally connected with the wire orienting portion 22 to constitute a orthographic structure. On the upper surface of the wire orienting portion 22, a plurality of wire channels 222, 242 are defined to extend through the wire orienting portion 22. The wire channels 222 are used to receive a plurality of low-voltage wires 220, the wire channels 242 are used to receive a plurality of high-voltage wires 240. Furthermore, in front of the lamp orienting portion 24, a plurality of lamp channels 244 are defined to extend backward to communicate with said wire channels 242 for accommodating a plurality of lamps 26 therein. Actually, each lamp 26 needs to be configured with a power wire module 210 (including, for example, the low-voltage power wire 220 and high-voltage power wire 240). The lamp 26 is electrically connected with said high-voltage power wire 240 via a solder point 28. In the prior art, a process of encasing the lamp 26 and associated wires 220, 240 into the holding device 20 includes two steps S1 and S2.

As shown in FIG. 2, in the step S1, firstly the high-voltage power wire 240 and the low-voltage power wire 220 are breadthwise encased into the wire orienting portion 22 of the holding device 20 through the wire channel 222, 224, separately. After perforating through a back wall of the wire orienting portion 22, the low-voltage wire 220 is bent downward vertically. The high-voltage wire 240 enters the wire channel 242 along a horizontal direction, and then is bent at a position where the wire channel 242 intersects with the lamp channel 244 to further extend downwards along a vertical direction to reach outside the lamp channel 244. In the step S2, the holding device 20 perforated with associated power wire 220, 240 has to carefully move downward on along the power wire 220, 240, as 90-degree rotation of the hold device 20 relative to the power wire 240, until the lamp 26 enters the holding device 20 (as shown in dotted line), wherein one end of the lamp 26 is received in the wire channel 242, a solder point between the lamp 26 and the high-voltage wire 240 is received in a position where the wire channel 242 intersects with the lamp channel 244. During the process of moving the holding device 20 along the power wires 220, 240 at 90-degree rotation for arriving at the lamp 26, if a moving force is not suitable or a moving direction is not correct, the lamp 26 can be very easy to be bent or the tender solder point 28 can be damaged. In the assemble process, once a lamp 26 is ruptured in the holding device 20 or the solder point 28 is damaged in the holding device 20, it's very difficult to take out lamp 26 or the solder point 28 from the holding device 20 for repair or rework. This would result in an uncontrolled soldering quality and an inferior manufacturing yield. Especially, if the holding device 20 can be assembled with a plurality of lamps and associated power wire modules in each process, the whole holding device 20 will become a waster once any one of the lamps 26 is ruptured or one of the solder points 28 is damaged. Understandingly, the conventional method for assembling the holding device 20 is time-consuming and laborious, and the inferior manufacturing yield and its design harmful to reassemble would result in a costly manufacture.

To resolve the drawbacks of said conventional holding device, it is necessary to develop a holder structure capable of simplifying the assembling process and accommodating the lamp and the power wires therein, effectively.

BRIEF SUMMARY OF THE INVENTION

Therefore, to resolve the abovementioned drawbacks, a primary object of the present invention is to provide a holder structure, which is suitable for retaining at least one lamp and associated wire within a backlight module in a simplified assembling process and labor hour saving.

Another object of the present invention is to provide a holder structure, which can avoid damage of a lamp or a solder point between a wire and the lamp during a assembly process, so as to raise manufacturing yield.

Another object of the present invention is to provide a holder structure, which is capable of simply and conventionally replacing a lamp and associated wire even if the holder structure needs to be reassembled.

A further object of the present invention is to provide a holder structure, which can rapidly orient and firmly retain at least one lamp and associated wire within a backlight module.

To accomplish the above invention objects, the present invention provides a holder structure for retaining at least one lamp and associated wire within a backlight module, which comprises a main body, and a reflector for receiving a lamp power module (including a lamp, a high-voltage power wire and a low-voltage power wire) therein. The main body has one lamp orienting portion and one wire orienting portion. The lamp orienting portion has at least one first orienting slot for accommodating the lamp therein, and a second orienting slot for accommodating the high-voltage power wire connected with said lamp via a solder point. The wire orienting portion further has at least one third orienting slot for accommodating the low-voltage power wire.

In the holder structure, a conjunct external sidewall jointed between the lamp orienting portion and the wire orienting portion forms at least one first groove and second groove. The first groove and the second groove respectively communicate with said first orienting slot, second orienting slot and third orienting slot. The first groove divides a lateral slot wall of each of the first and second orienting slots into two opposite flexible walls each which can provide a flexibility required for assembling the lamp and associated wire. Each two opposite flexible walls have two protrusions respectively formed on the outsides thereof to hook with corresponding openings defined on the reflector, whereby the lamp and power wires are able to be firmly retained in the associated slots, respectively.

The advantages and novel features of the invention will become more apparent from the following detailed description of a preferred embodiment when taken in conjunction with the accompanying drawings.

BRIEF DESCRIPTION OF THE DRAWINGS

The present invention may best be understood through the following description with reference to the accompanying drawings, in which.

DETAILED DESCRIPTION OF THE INVENTION

Figure 1:
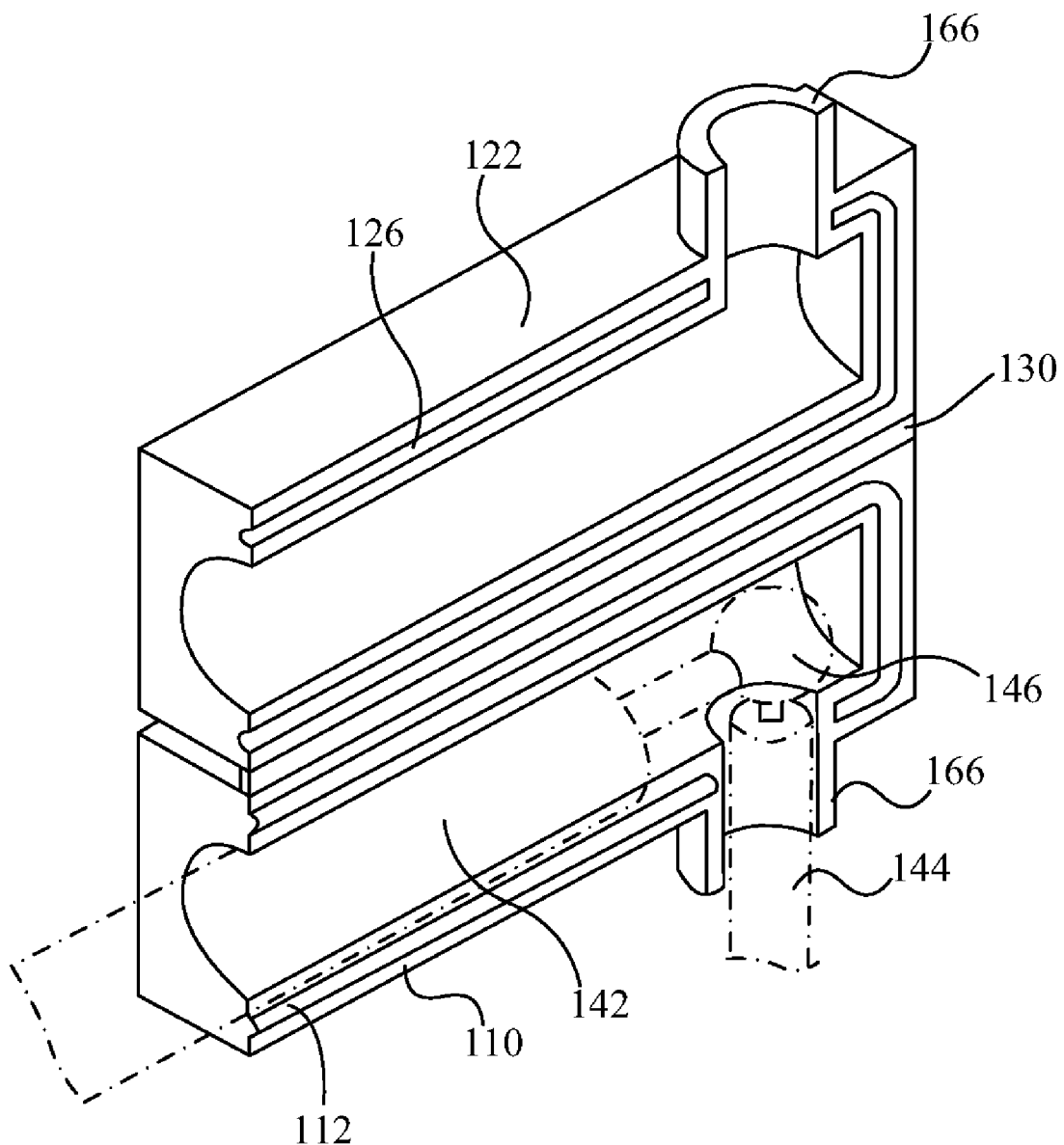
FIG. 1 illustrates a conventional holder structure.
Figure 2:
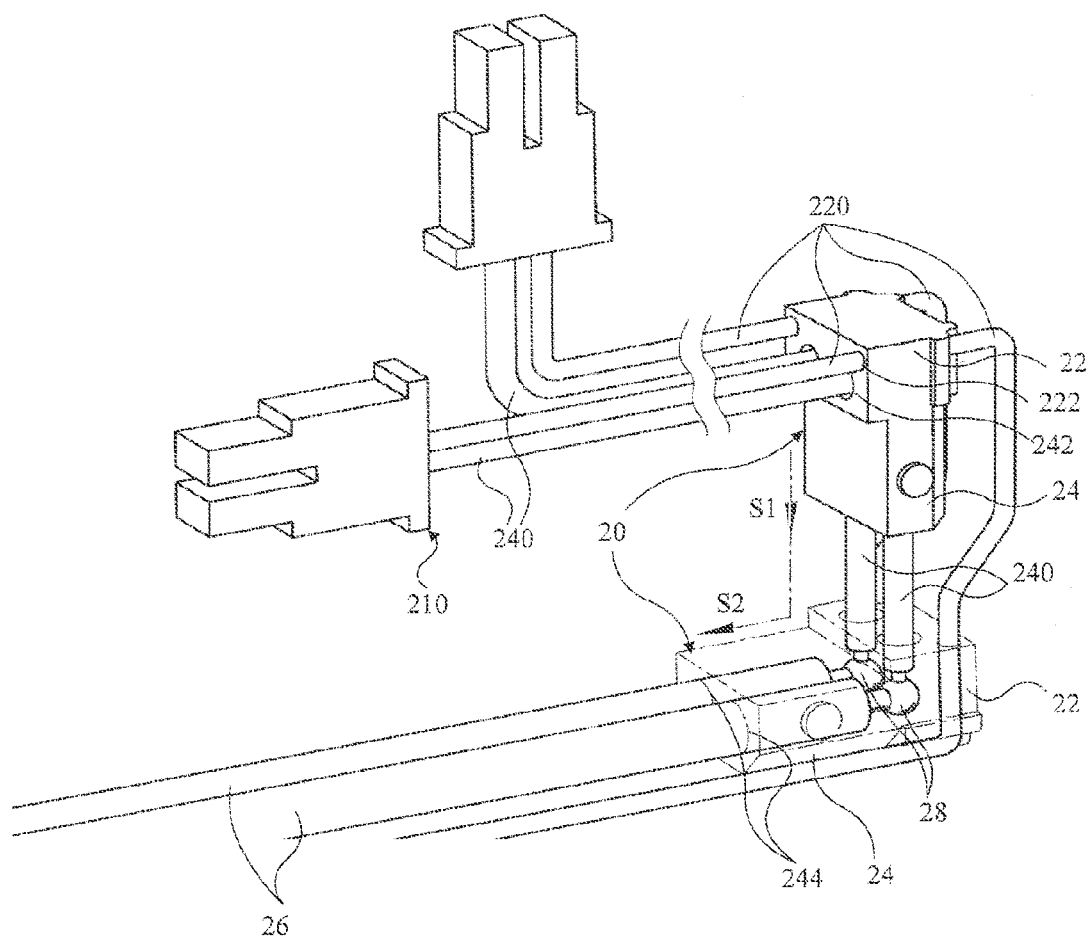
FIG. 2 illustrates an assembling process of another conventional holder structure.
Figure 3:
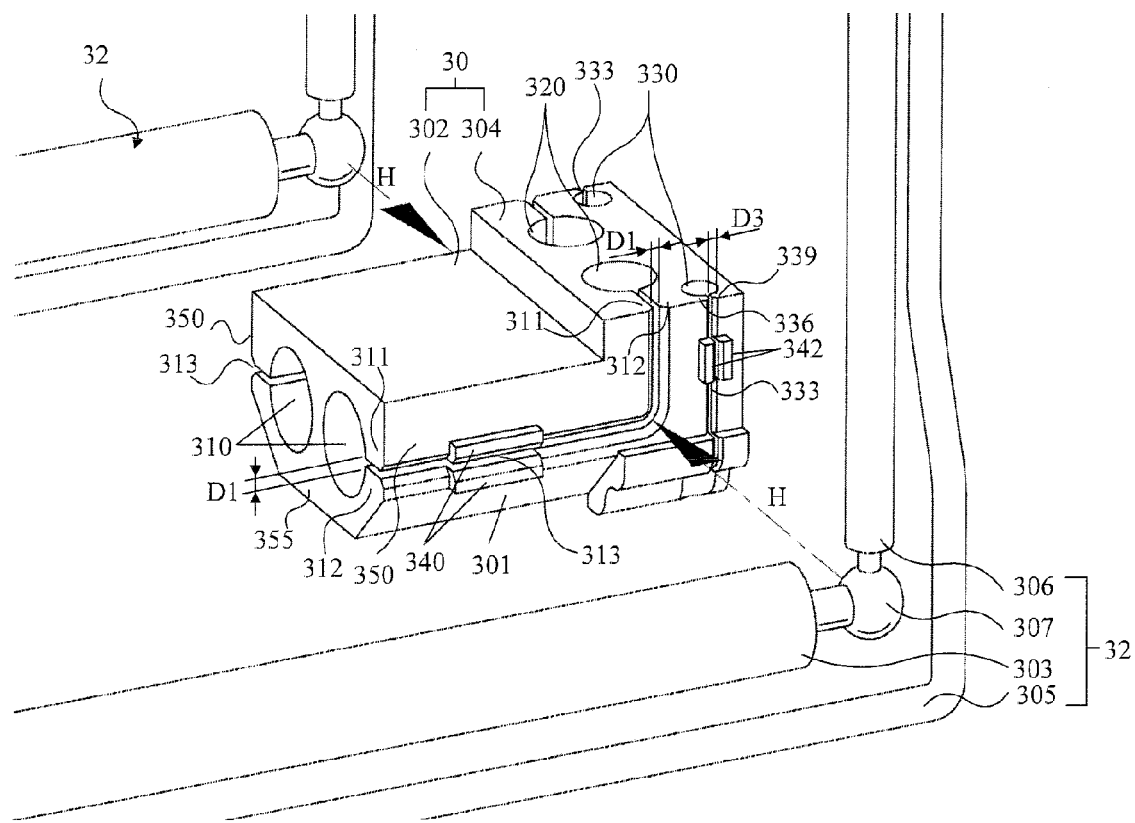
FIG. 3 illustrates a schematic assembling diagram of the holder structure with a lamp power module according to a first embodiment of the present invention.

Please firstly refer to illustration of FIG. 3, a holder structure 30 according to a first preferred embodiment of the present invention is introduced herein, which is used to orient and accommodate two groups of lamp power modules 32 therein. Each of the lamp power module 32 comprises a light device 303 (such as a lamp), a high-voltage wire 306 connected with an end of the lamp 303 via a solder point 307, and a low-voltage wire 305. The holder structure 30 includes a main body 301 made of flexible material, which comprises a lamp orienting portion 302 and a wire orienting portion 304, wherein the wire orienting portion 304 extends downwards to be perpendicular with the lamp orienting portion 302.

On the two sides of the lamp orienting portion 302, two first orienting slots 301 are defined separately. Each first orienting slot 310 extends through a front surface 355 of the lamp orienting portion 302 and then extends toward an opposite back surface, so as to accommodate and orient an end of the lamp 303.

Said wire orienting portion 304 has two second orienting slots 320 and two third orienting slots 330. Each second orienting slot 320 extends through one upper surface of the wire orienting portion 304 and then extends down and toward an opposite lower surface to perpendicularly connect with the corresponding first orienting slot 310. Thus, the second orienting slot 320 can be used to accommodate and orient the corresponding high-voltage wire 306. A communicating space formed on perpendicular of the first orienting slot 310 to the second orienting slot 320 can be used to accommodate the solder point 307. Furthermore, the third orienting slot 330 extends through the upper surface of the wire orienting portion 304 and extends down and towards the opposite lower surface along a long-axis direction parallel to the second orienting slot 320 for accommodating and orienting the corresponding low-voltage wire 305.

For convenience on rapidly assembling the lamp 303 and the high-voltage wire 306 into the holder structure 30, two first grooves 313 with a L shape are defined on the main body 301 of the holder structure 30 according to the present invention. Each first groove 313 primarily extends breadthwise along the first orienting slot 310 of the lamp orienting portion 302, and then extends lengthwise along the second orienting slot 320 of the wire orienting portion 304. Thus, the first groove 313 forms on a conjunct external sidewall 350 jointed between the lamp orienting portion 302 and the wire orienting portion 304 and communicates with the first orienting slot 310 and the second orienting slot 320, separately. Because the conjunct external sidewall 350 between the lamp orienting portion 302 and the wire orienting portion 304 is made of flexible material, the lateral slot walls (or the external sidewalls 350) of the first orienting slot 310 and the second orienting slot 320 are respectively divided by the first groove 313 (with a width D1) into two up-down or left-right opposite flexible walls 311, 312. Each two opposite flexible walls 311, 312 of the first groove 313 have two first and second protrusions 340 respectively formed on the outsides thereof.

For the convenience on rapidly assembling the low-voltage wire 305 into the holder structure 30, the holder structure 30 further has two second grooves 333 formed on two opposite external sidewalls 350 of the wire orienting portion 304. Each of the second grooves 333 extends lengthwise along the third orienting slot 330 of the wire orienting portion 304 and then extends through the up and down surfaces of the wire orienting portion 304 to form on the external sidewall 350 of the wire orienting portion 304. The second groove 333 with a width D3 extends inwards and through the corresponding external sidewall 350 to communicate with the third orienting slot 330, and similarly divides the lateral slot walls (or the external sidewalls 350) of the third orienting slot 330 into two left-right opposite flexible walls 336, 339. Each two opposite flexible walls 336, 339 of the second groove 333 have two first and second protrusions 342 respectively formed on the outsides thereof.

As shown in FIG. 3, when the holder structure 30 is assembled, the lamp 303 and high-voltage wire 306 (including the solder point 307) move toward an lateral-assembling direction "H", the lamp 303 and high-voltage wire 306 will be very easily pressed into the first orienting slot 310 and the second orienting slot 320 through the first groove 313. The low-voltage wire 305 also move toward the lateral-assembling direction "H", similarly, the low-voltage wire 305 will be very easily pressed into the third orienting slot 330 through the second groove 333. This avoids the problems happened in the prior art, such as difficulty of assemble or possibility of bending the solder point and so on. This is because when the lamp 303 and the high-voltage wire 306 according to the present invention are pressed into the first orienting slot 310 and the second orienting slot 320 through the first groove 313, the lamp 303 and the high-voltage wire 306 will flexibly compress the flexible walls 311, 312 of the first orienting slot 210 and the second orienting slot 320 to distort. This will separate the flexible walls 311, 312 far away from each other to stretch the first groove 313 from a width D1 to a wider width D2 (shown in FIG. 6).

Figure 4:
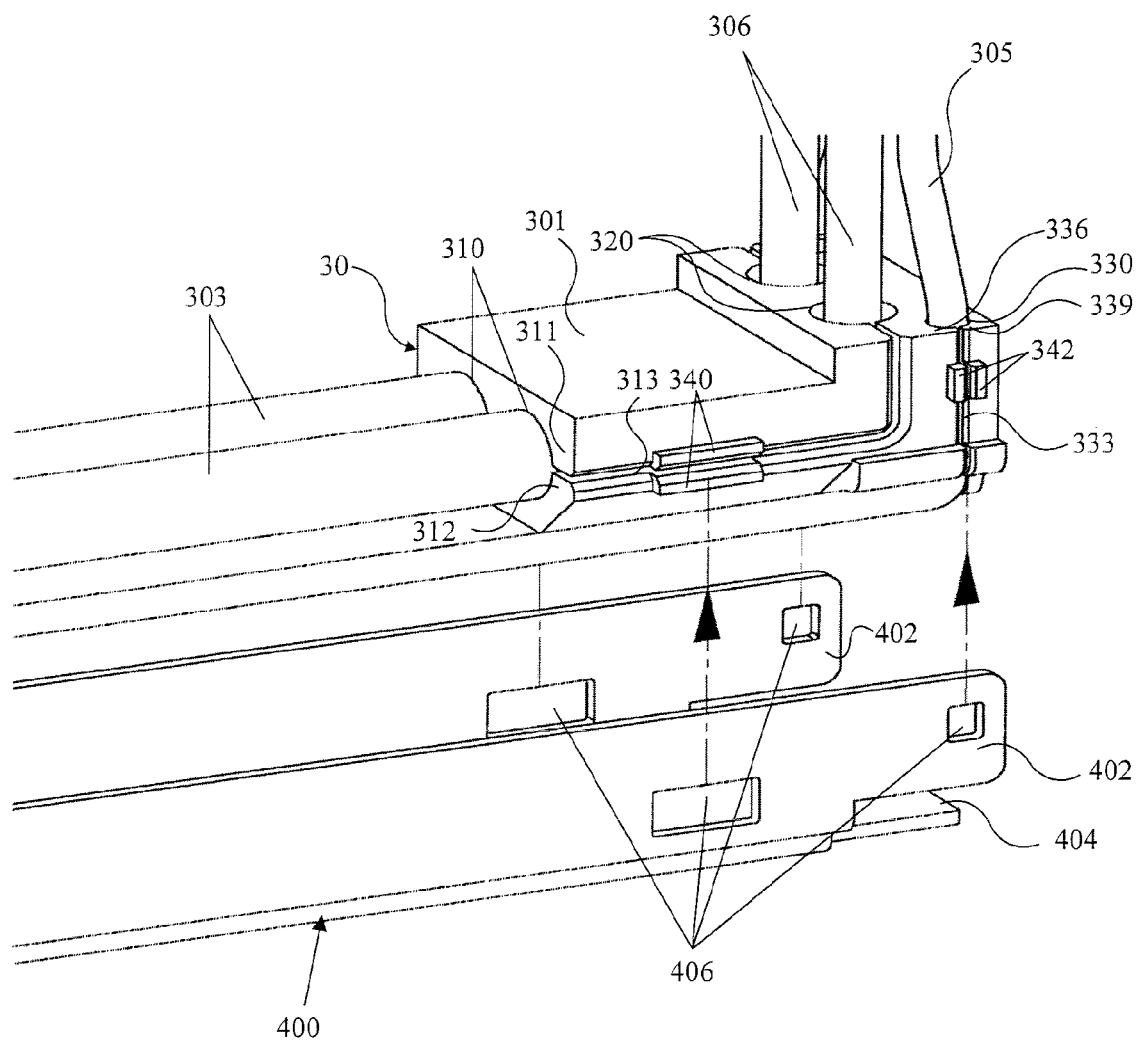
FIG. 4 illustrates a schematic partial assembling diagram of the holder structure as shown in FIG. 3 with a reflector.
Figure 6:
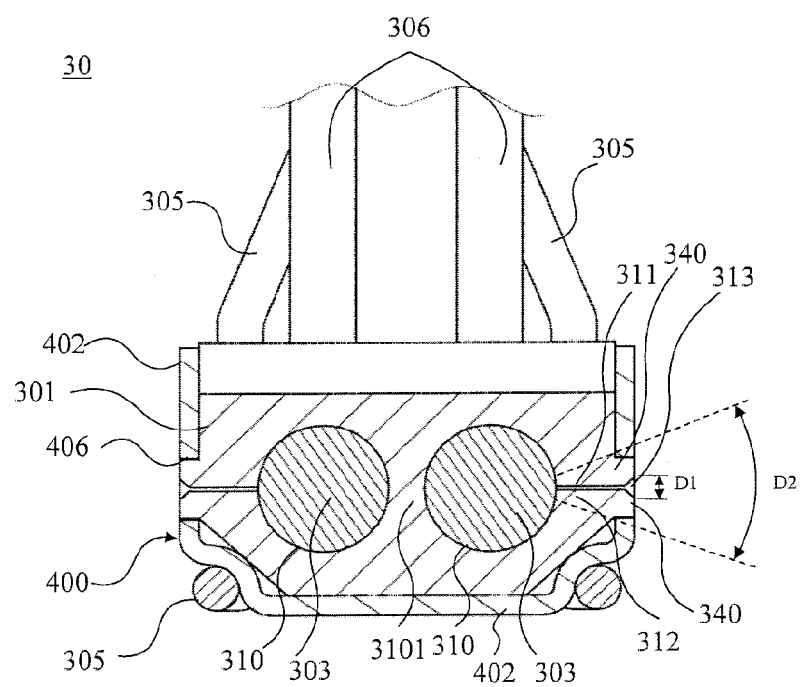
FIG. 6 illustrates a sectional view of the holder structure taken along a dividing line A-A in FIG. 5 according to the present invention.

Please refer to FIGS. 4 and 6, once the lamp 303 and the high-voltage wire 306 have been accommodated in the first orienting slot 310 and the second orienting slot 320, the flexible walls 311, 312 of the first groove 213 will resile from the width D2 to the width D1 or a width enough to orient the lamp 303 and the high-voltage wire 306 in the orienting slots 310, 320. In practical, the width D1 of the first groove 313 is designed less than the slot diameter of the first orienting slot 310 and the second orienting slot 320 so as to achieve a flexible orientation effect. As shown in FIG. 6, it illustrates that, a conjunct lateral slot wall jointed between the two parallel-neighboring first orienting slot 310 can be defined as a conjunct connecting wall 3101. Both the left side and right side of the conjunct connecting wall 3101 connect with the two opposite flexible walls 311, 312 so that a section of each first orienting slot 310 likes a 'C' shape, so as to offer a flexibilities for the two opposite flexible walls 336, 339. As shown in FIG. 4, bases on the same principle, once the low-voltage wire 305 have been accommodated in the third orienting slot 330, the flexible walls 336, 339 of the second groove 333 will resile from a wider width (not labeled) to the original width D3 (shown in FIG. 3) or a width enough to orient the low-voltage wire 305 in the orienting slot 330. In practical, the width D3 of the second groove 333 is designed less than the slot diameter of the third orienting slot 330 so as to achieve said flexible orientation effect.

Figure 5:
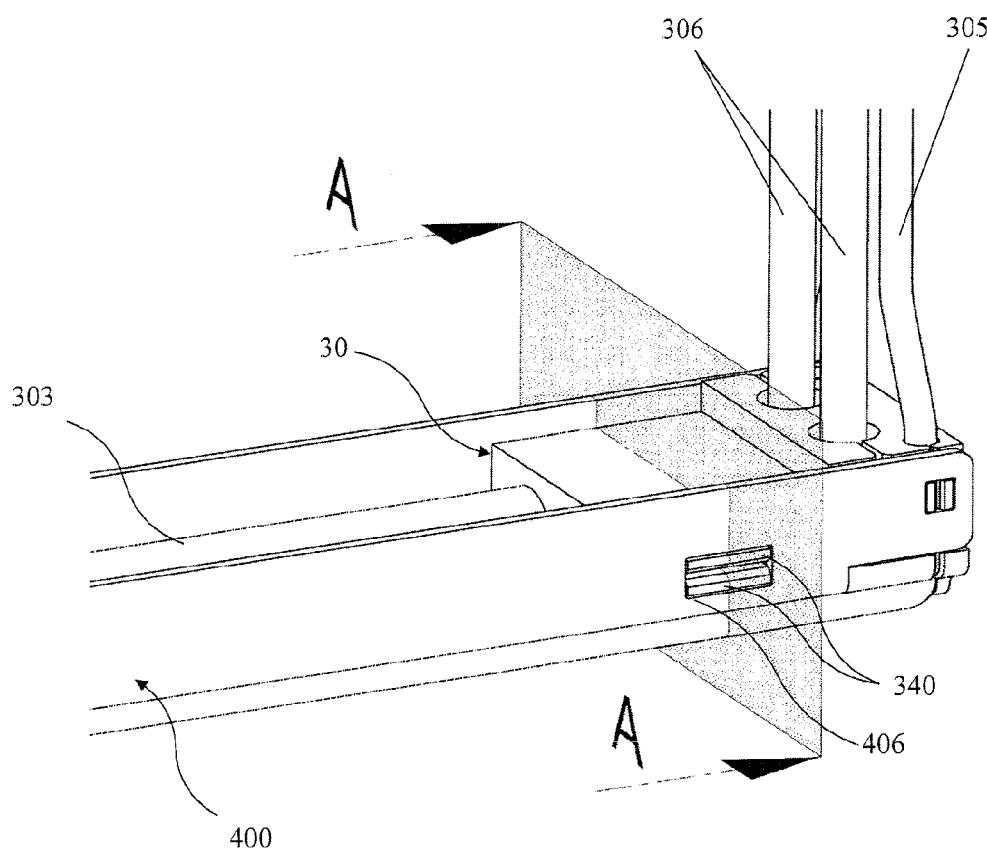
FIG. 5 illustrates a schematic complete assembling diagram of the holder structure as shown in FIG. 3.

Please refer to FIGS. 4 and 5, the holder structure 30 according to the first preferred embodiment of the present invention further comprises a reflector 400. The reflector 400 has a base plate 404, two erect baffles 402 are respectively defined on two lateral sides of the base plate 404, and respectively form a pluralities of openings 406 corresponding to hook with said first and second protrusions 340, 342 of the main body 301. When the main body 301 of the holder structure 30 accompanying the lamp 303, the high-voltage wire 306 and the low-voltage wire 305 are assembled into the reflector 400, said openings 406 hook with the first and second protrusions 340, 342 outside of the flexible walls 311, 312, 336, 339 so as to force each pair of flexible walls 311, 312 or 336, 339 to approach with each other (shown in FIG. 6) to curtail the width of each groove 313, 333, whereby the lamp 303 and power wires 305, 306 are able to be firmly retained in the associated slots 310, 320 and 330 respectively. The complete-assembled structure is shown in FIG. 5.

Figure 7:
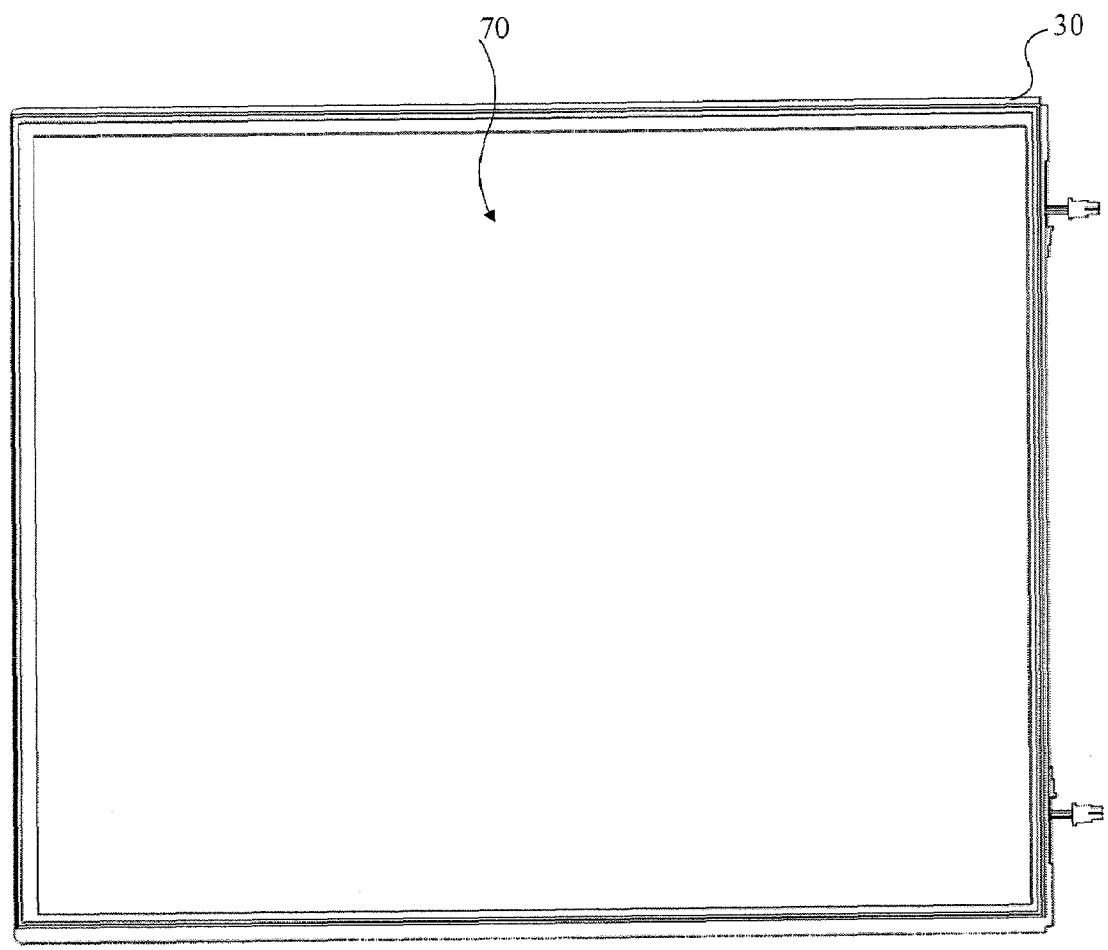
FIG. 7 illustrates application of the holder structure shown in FIG. 5 a backlight module.

FIG. 6 illustrates a sectional view of the holder structure 30 taken along a dividing line A-A in FIG. 5 according to the present invention. As shown in FIG. 6, the main body 301 of the holder structure 30 accompanying the lamp 303, the high-voltage wire 306 and the low-voltage wire 305 have been assembled in the reflector 400. FIG. 7 illustrates application of the holder structure 30 as shown in FIG. 5 in a backlight module.

Figure 8A:
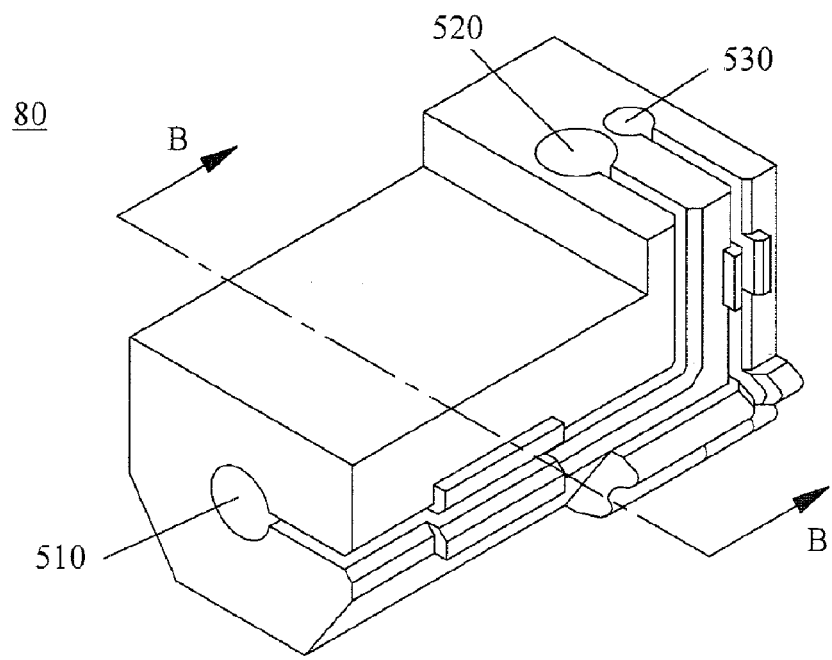
FIG. 8A illustrates a holder structure according to a second embodiment of the present invention.
Figure 8B:
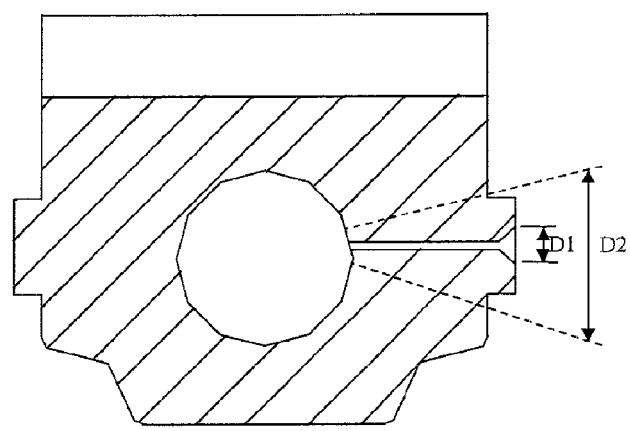
FIG. 8B illustrates a sectional view of the holder structure taken along a dividing line B-B in FIG. 8B.

Please refer to FIGS. 8A and 8B, which illustrates a holder structure 80 of a second preferred embodiment according to the present invention. A difference between the first and second preferred embodiment is that, in the second preferred embodiment, the holder structure 80 only has a single first orienting slot 510, a single second orienting slot 520 and a single third orienting slot 530 suitable for accommodating a single lamp power module. The other elements of the second preferred embodiment are same as that in the first preferred embodiment, and will not be detailed here.

Figure 9A:
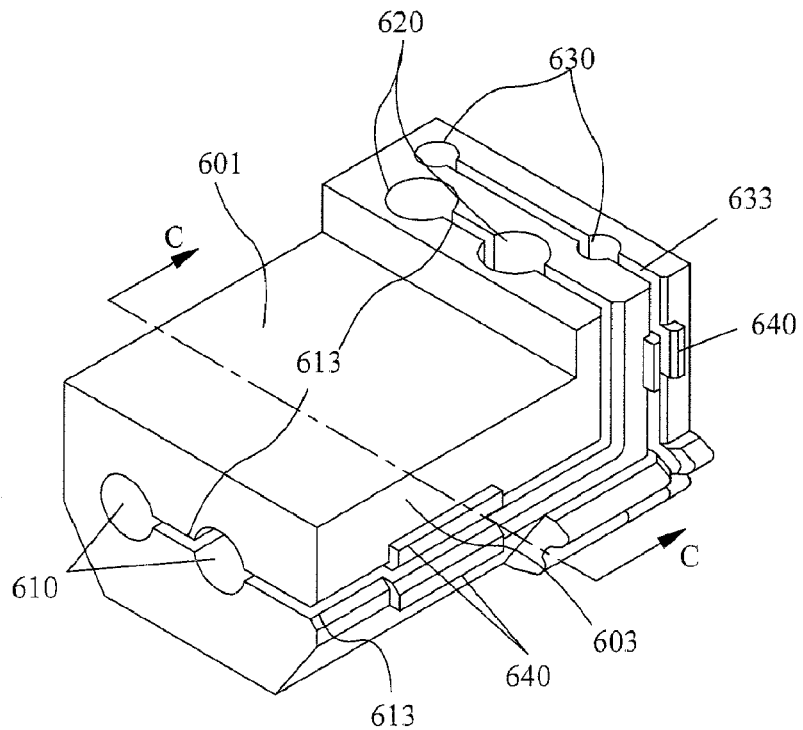
FIG. 9A illustrates a holder structure according to a third embodiment of the present invention.
Figure 9B:
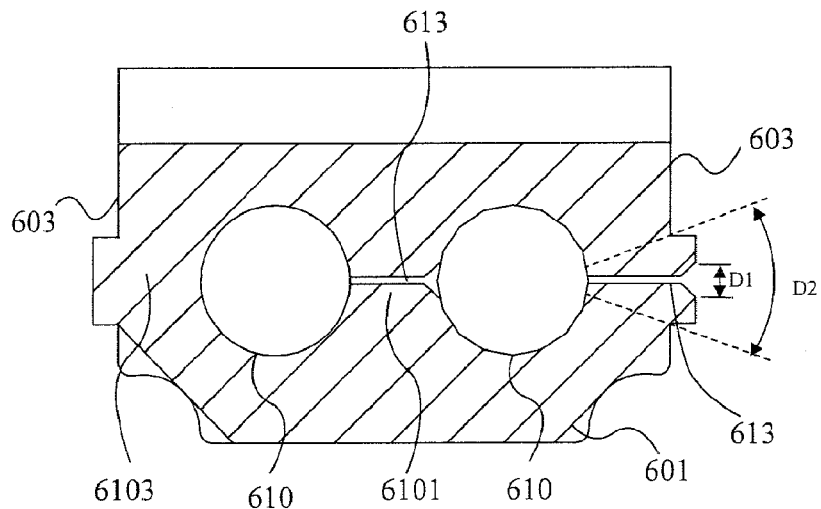
FIG. 9B illustrates a sectional view of the holder structure taken along a dividing line C-C in FIG. 9B.

Please refer to FIGS. 9A and 9B, which illustrates a holder structure 90 of a third preferred embodiment according to the present invention, a difference between the first and third preferred embodiment is that, in the third preferred embodiment, only one sidewall 603 of the main body 601 of the holder structure 90 defines a first groove 613 and a second groove 633 for assembling two group of lamp power modules in turn. The first groove 613 is formed on an external sidewall 603 of the main body 601 and extends inwards, wherein the first groove 613 extends to intersect and communicate with the first orienting slot 610 nearby to the external sidewall 603, and then further passes through the conjunct connecting wall 6101 between two adjacent first orienting slots 610, till extending to intersect and communicate with all the neighbor first orienting slot 610. The two adjacent first orienting slots 610 communicate with each other and each first orienting slot 610 also communicate with the corresponding second orienting slot 620. By the first groove 613, the external sidewall 603 and the conjunct connecting wall 6101 both are divided into two opposite flexible walls. On the same principle, the second groove 633 extends inwards according the same method as the first groove 613, which extends through a conjunct connecting wall (not labeled) jointed between two adjacent third orienting slots 630, till communicating with all neighboring third orienting slot 630. Furthermore, as shown in FIG. 9B, the other opposite external sidewall 603 of the main body 601 (or the lateral slot wall 6103 of one orienting slot 610) connects the two divided opposite flexible walls of the conjunct connecting wall 6101, so it can supply flexibility for every flexible wall.

During the process of assembling the two group lamp power modules into the holder structure 90, each of the two group lamp power modules is sequentially disposed into the corresponding orienting slot 610, 620 and 630 in the main body 601 of the holder structure 90 through the single grooves 613, 633. For example, when two group lamps and high-voltage wires are separately pressed into two first orienting slots 610 and the second orienting slot 620, it will stretch the distance between the two opposite flexible walls of the first groove 613 and the conjunct connecting wall 6101 to widen, from a width D1 widen to a wider width D2 (as shown in FIG. 9B). After pressing the two group lamps and wires into the first orienting slots 610 and the second orienting slot 620 through the first groove 613, the first groove 613 will resile from a width D2 to a width enough to fixedly accommodate the lamps and wires in the orienting slots therein.

In conclusion, the holder structure according to the present invention is capable of simplifying its assembling process, decreasing manufacturing time, raising manufacturing yield, firmly orienting and retaining the lamps and power wires, and protecting the solder points of the lamps effectively, even that the replacements of the lamps and power wires during rework are very easy.

It is to be understood, however, that even though numerous characteristics and advantages of the present invention have been set fourth in the foregoing description, together with details of the structure and function of the invention, the disclosure is illustrative only, and changes may be made in detail within the principles of the invention to the full extent indicated by the broad general meaning of the terms in which the appended claims are expressed.

What is claimed is:

1. A holder structure, comprising:
   a lamp orienting portion having at least one first orienting slot extending from an end of the lamp orienting portion toward the other opposite end of the lamp orienting portion, and an external sidewall made of flexible material; and
   a wire orienting portion having at least one second orienting slot extending from an end of the wire orienting portion toward the other opposite end of the wire orienting portion to communicate with the first orienting slot, and an external sidewall made of flexible material;
   wherein the external sidewalls of the lamp orienting portion and wire orienting portion form a first groove extending along the first orienting slot and the second orienting slot to communicate with the first orienting slot and the second orienting slot, the wire orienting portion has a third orienting slot extending from the end of the wire orienting portion toward the other opposite end of the wire orienting portion, and the external sidewalls of the wire orienting portion form a second groove extending along the third orienting slot to communicate with the third orienting slot.

2. The holder structure of claim 1, wherein the lamp orienting portion is approximately vertical with the wire orienting portion.

3. The holder structure of claim 1, wherein a width of the first groove is less than slot diameters of the first orienting slot and the second orienting slot.

4. The holder structure of claim 1, wherein a width of the second groove is less than a diameter of the third orienting slot.

5. The holder structure of claim 1, wherein the wire orienting portion has two protrusions, which are formed outside the second groove.

6. The holder structure of claim 1, wherein the lamp orienting portion has two protrusions, which are formed outside the first groove.

7. The holder structure of claim 6, further comprising a reflector that has two openings for respectively hooking with said protrusions.

* * * * *